United States Patent

[11] 3,574,323

| [72] | Inventor | William F. Shiflet<br>Rancho Cordova, Calif. |
|---|---|---|
| [21] | Appl. No. | 808,449 |
| [22] | Filed | Mar. 19, 1969 |
| [45] | Patented | Apr. 13, 1971 |
| [73] | Assignee | Aerojet-General Corporation<br>El Monte, Calif. |

[54] SKIRT CONTROLLERS FOR FLUID CUSHIONS VEHICLES
5 Claims, 3 Drawing Figs.

| [52] | U.S. Cl. | 180/127 |
|---|---|---|
| [51] | Int. Cl. | B60v 1/16 |
| [50] | Field of Search | 180/127, 128, 121 |

[56] References Cited
UNITED STATES PATENTS

| 3,180,443 | 4/1965 | Jones | 180/128 |
|---|---|---|---|
| 3,266,757 | 8/1966 | Guienne | 180/127X |
| 3,272,275 | 9/1966 | Faure | 180/127 |
| 3,134,452 | 5/1964 | Latimer-Needham | 180/128 |
| 3,339,654 | 9/1967 | Bertin et al. | 180/127 |

*Primary Examiner*—A. Harry Levy
*Attorneys*—Edward O. Ansell and D. Gordon Angus ABSTRACT: A controller according to the present disclosure comprises a restraining means, preferably in the form of a triangular membrane, attached to the lowermost portion of a skirt or a fluid cushion cell and to the fluid cushion vehicle so as to maintain the cell noncircular. The restraining means provides independent restraint of a side of skirt of the vehicle, thereby permitting flexibility of the cell when the vehicle traverses obstacles.

PATENTED APR 13 1971

3,574,323

INVENTOR.
WILLIAM F. SHIFLET
BY
D. Gordon Angus
ATTORNEY

SKIRT CONTROLLERS FOR FLUID CUSHIONS VEHICLES

This invention relates to fluid cushion vehicles, and particularly to skirt controllers for fluid cushions.

Peripheral skirts for fluid cushion vehicles ordinarily assume a circular configuration when pressurized unless they are restrained into a configuration other than circular. Skirts having a noncircular shape are often desirable to contain the lifting force of the skirt within the bounds of the vehicle. Heretofore, skirt controllers, in the form of tie membranes or the like, have been attached to opposite sides of fluid cushion skirts to restrain the opposite sides of the skirt so that when the skirt is pressurized, it assumes a noncircular configuration.

For example, tie membranes may be attached to the opposite side of the skirt to restrain the billowing of the skirt in one direction so that the skirt assumes a generally elongated configuration.

Heretofore, as an air cushion vehicle traversed a particular terrain, conventional skirt controllers often contacted obstructing obstacles. When the tie controller contacted an obstruction, the membrane, being flexible, ordinarily deformed along the length of the skirt, thereby drawing in the opposite sides of the skirt and tending to lift the sides of the skirt to permit the escape of pressurized fluid from the fluid chamber. Also, the tie membrane represented a substantial drag area which produced drag on the vehicle or the vehicle moved.

It is an object of the present invention to provide skirt controllers for fluid cushions which provide a minimum resistance when traversing obstacles and a substantially less drag area than prior controllers.

Another object of the present invention is to provide fluid cushions for fluid cushion vehicles having controller membranes which are less prone to produce drag or catch on obstacles while the vehicle is traversing an area.

A skirt controller, according to the present invention, comprises a generally triangular membrane having one side supported by the base of the fluid cushion vehicle, one side supported by a side of a fluid cushion, and the third side remaining unattached. The controller restrains the peripheral skirt from assuming a generally circular configuration when the skirt is pressurized.

One feature of the present invention resides in the fact that the force restraining a particular side of the cushion cell is supported by the vehicle rather than the opposite side of the cell. This arrangement permits flexibility of the cell, while the vehicle traverses an area.

Another feature of the controller according to the present invention resides in the fact that if the controller contacts an object while the vehicle is traversing an obstacle, both the controller and the skirt can fold to enable the lift pressure to push the skirt back down.

The above and other features of this invention will be more fully understood in the following detailed description, and the accompanying drawings, in which.

Figure 1:
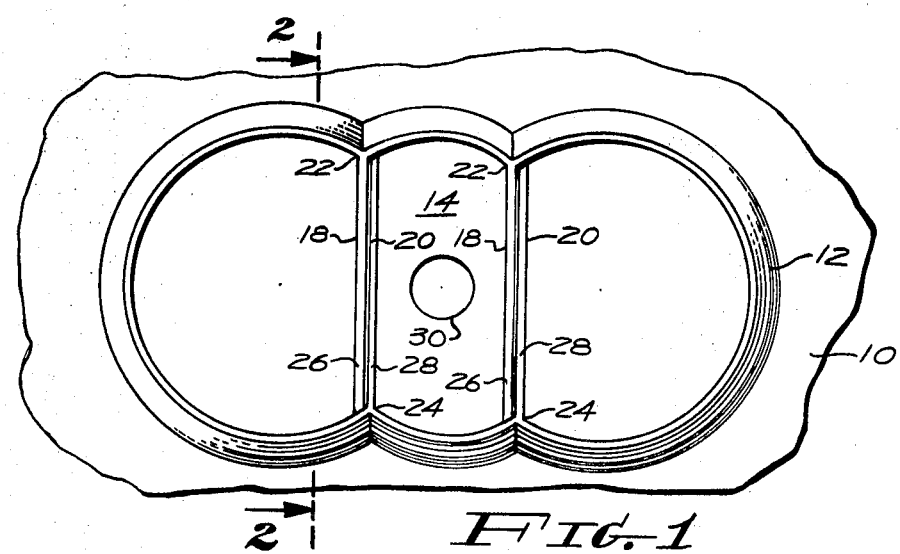
FIG. 1 is a bottom view of a fluid cushion for a fluid cushion vehicle having controllers in accordance with the presently preferred embodiment of the present invention.
Figure 2:
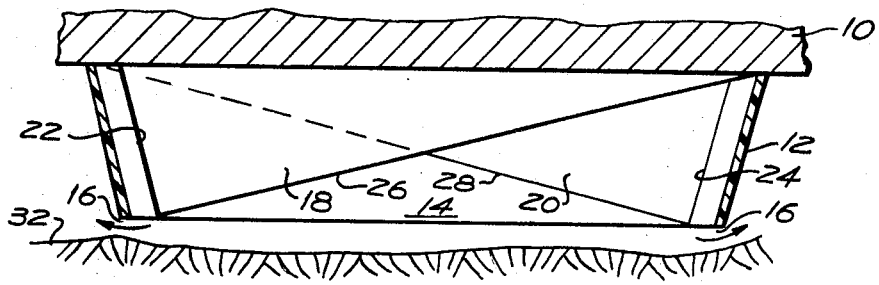
FIG. 2 is a section view taken along line 2—2 in FIG. 1.

In the drawings there is illustrated a skirt 12 mounted to the base 10 of a fluid cushion vehicle (not shown). By way of example, skirt 12 may be constructed of a suitable flexible membrane such as neoprene-coated dacron or neoprene coated nylon. The skirt is fixedly attached to base 10 of the fluid cushion vehicle and defines a fluid chamber 14 having an opening 16 at the bottom of the skirt. Fluid chamber 14 defined by skirt 12 forms a fluid cushion for supporting the fluid cushion vehicle when pressurized with suitable fluid, such as air.

Triangular-shaped membranes 18 and 20 are attached to opposite sidewalls of skirt 12 in a substantially perpendicular plane to restrain the expansion of the skirt so that the skirt forms a noncircular configuration when filled with pressurized fluid. One edge of triangular controller membrane 18 is attached to the wall of skirt 12 at location 22, and an edge of triangular controller membrane 20 is attached to an opposite sidewall of skirt 12 at location 24. The longest edge of the triangular-shaped controller membranes are each fixedly attached, at separate locations, to base 10 of the fluid cushion vehicle, and preferably in parallel, thereby leaving an edge 26, 28 of each membrane 18, 20 unattached and extending between the lowermost portion of the skirt and the base of the vehicle adjacent on opposite side of the skirt. Edges 26 and 28 are shorter than the edge attached to base 10 of the respective membrane to restrain the skirt from billowing.

In operation, fluid under pressure is admitted into chamber 14 through a suitable aperture or orifice 30 in base 10. The pressurized fluid in chamber 14 causes skirt 10 to billow outwardly, and the pressurized fluid in chamber 14 reacts against the surface of ground 32 and against the surface of base 10 within the chamber so that the pressurized fluid in the chamber forces the base of the vehicle upwardly. As the pressure increases within chamber 14, the vehicle lifts higher so as to increase the size of the opening 16 beneath the skirt, thereby permitting the escape of fluid from the chamber. As the pressure in chamber 14 decreases, the vehicle lowers thereby decreasing the size of opening 16 so as to contain more pressurized fluid.

The noncircular configuration of the cushion cell is maintained by virtue of the force tending to restrain billowing of the cell supported by the vehicle and transmitted predominately along the free edge 26 or 28 of the respective membrane. Since the free edge 26, 28 is shorter than the edge attached to the vehicle, the bottom of the skirt is pulled in and restrained from billowing.

Figure 3:
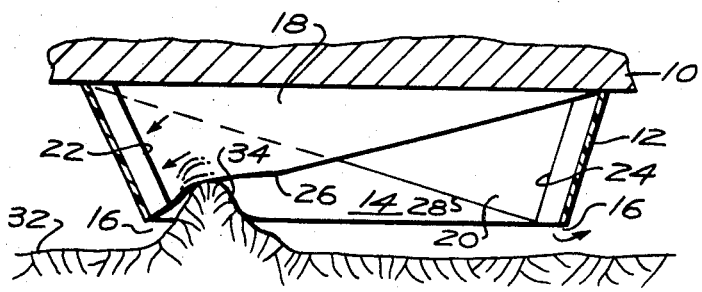
FIG. 3 is a section view as in FIG. 2 illustrating the effect of an object striking the controller.

As the vehicle traverses the surface 32 of the ground, the triangular-shaped membranes 18 and 20 provide less air resistance than prior substantially trapazoidal-shaped controllers. Furthermore, in the event that an obstacle, such as obstacle 34 illustrated in FIG. 3, should come into contact with a controller membrane, the membrane and the portion of the skirt to which it is attached fold back easily into the cushion cell, and the remainder of the cushion cell and skirt is left unaffected. Since each controller membrane is independently supporting one side of the skirt, the opposite side of the skirt is not drawn upwardly and abnormal quantities of pressurized fluid do not escape from chamber 14. Furthermore, due to the triangular shape to controllers 18 and 20, an obstacle, such as obstacle 34 illustrated in FIG. 3, will contact only certain ones of the controllers, the other controllers clearing the obstacle. Hence, although controller 18 is contacted by obstacle 34, controller 20 will clear the obstacle.

The cushion formed by the skirt does not lose an appreciable amount of pressurized fluid when an obstacle forces up one side of the skirt because the obstacle itself prevents excessive escape of fluid from one side, and the opposite side of the skirt, being independently restrained, is unaffected by the obstacle.

When the obstacle clears the cushion skirt and controller, pressure within the skirt forces the controller and skirt back to their original position to continue normal operation.

The present invention thus provides skirt controllers for fluid cushion vehicles which provide independent control of opposite sides of the skirt and maintain a noncircular configuration for the cushion so as to contain the cushion to an area beneath the vehicle. The controllers are effective in operation and are easily manufactured and installed.

This invention is not to be limited by the embodiment shown in the drawings and described in description, which is given by way of example and not of limitation, but only in accordance with the scope of the appended claims.

I claim:

1. In a fluid cushion vehicle having a flexible skirt depending from the vehicle chassis to define its fluid cushion chamber: a skirt controller comprising a flexible triangular membrane extending across the chamber having an edge supported by the chassis and an opposite corner attached to the lower edge of the skirt.

2. Apparatus according to claim 1 and an additional controller adjacent to and forming a pair with said controller, said additional controller also comprising a flexible triangular membrane extending across the chamber having an edge supported by the chassis and an opposite corner attached to the lower edge of the skirt, the opposite corners of the controllers of said pair being located at different points on the lower edge of the skirt.

3. Apparatus according to claim 2 and an additional pair of controllers connected to the chassis and skirt at points spaced from the points of connection of said pair.

4. Apparatus according to claim 3 wherein the planes of said pairs of controllers are substantially parallel.

5. Apparatus according to claim 4 wherein the planes of said pairs of controllers are substantially vertical.